United States Patent
Oryoji

(10) Patent No.: US 8,436,906 B2
(45) Date of Patent: May 7, 2013

(54) IMAGE PROCESSING APPARATUS, IMAGE PROCESSING METHOD, PROGRAM, AND RECORDING MEDIUM

(75) Inventor: Hiroshi Oryoji, Kanagawa (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 12/911,243

(22) Filed: Oct. 25, 2010

(65) Prior Publication Data

US 2011/0122265 A1    May 26, 2011

(30) Foreign Application Priority Data

Nov. 24, 2009  (JP) ................................ P2009-266704

(51) Int. Cl.
  *H04N 5/228* (2006.01)
(52) U.S. Cl.
  USPC .................................... 348/208.1; 348/222.1
(58) Field of Classification Search ............ 348/208.99, 348/208.1–208.5, 222.1
  See application file for complete search history.

(56) References Cited

U.S. PATENT DOCUMENTS

| 2004/0223548 A1* | 11/2004 | Kato et al. ............... 375/240.16 |
| 2009/0225174 A1* | 9/2009 | Handa et al. ............... 348/208.3 |
| 2009/0316009 A1* | 12/2009 | Ito et al. .................... 348/208.4 |

FOREIGN PATENT DOCUMENTS

JP    2008-78808    4/2008

* cited by examiner

*Primary Examiner* — Gevell Selby
(74) *Attorney, Agent, or Firm* — Finnegan, Henderson, Farabow, Garrett & Dunner, L.L.P.

(57) ABSTRACT

An image processing apparatus including a motion detecting unit for detecting the motion quantity of an image on the basis of plural frame images photographed by a CMOS image capturing device; a motion predicting unit for predicting a traveling speed of the image capturing apparatus when capturing an image on the basis of the motion quantity; a correction value calculating unit for calculating a correction value for correcting the motion quantity of the image so that, the larger the traveling speed is, the longer the traveling motion of the image capturing apparatus intended by a user remains; and a motion compensating unit for performing compensation that allows only the traveling motion of the image capturing apparatus intended by the user to remain in the image with the use of the correction value.

6 Claims, 17 Drawing Sheets

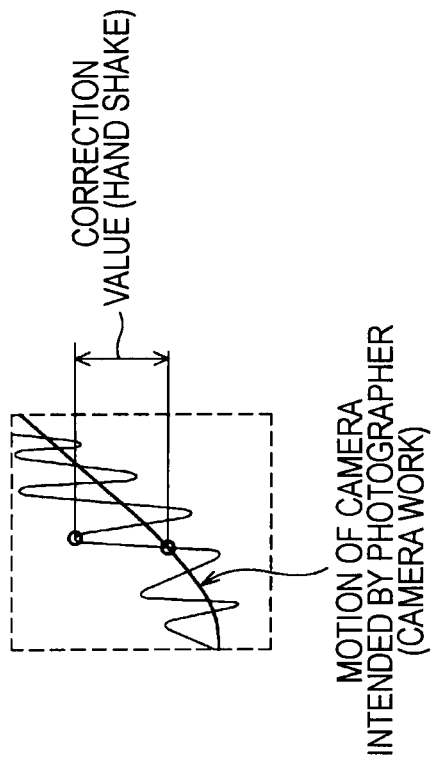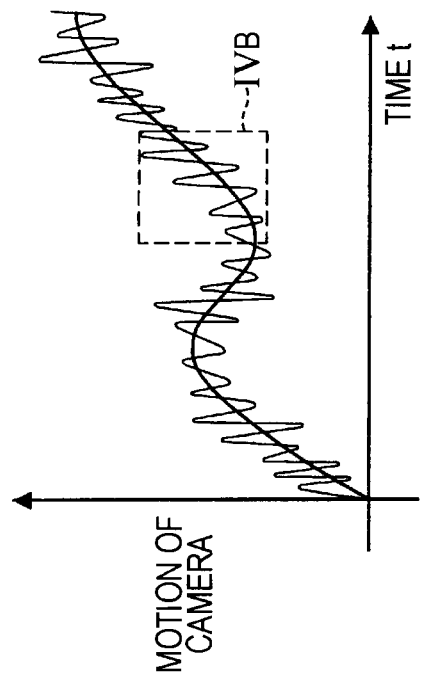

FIG. 5A
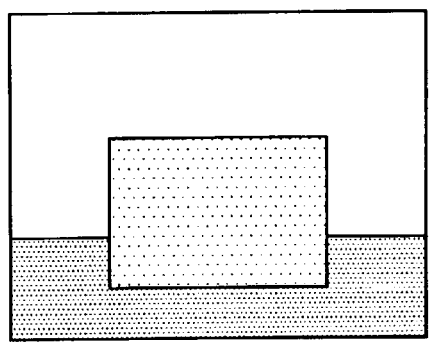
FIG. 5D
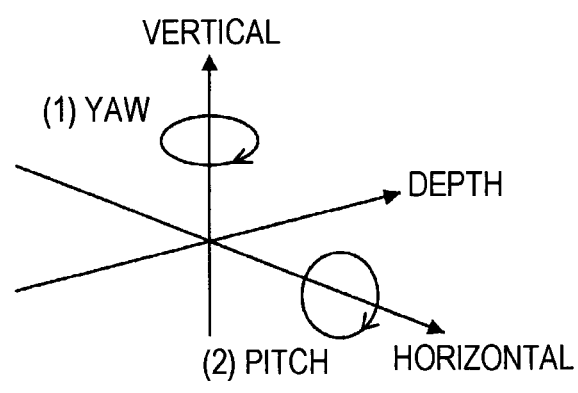
(1) YAW
(2) PITCH
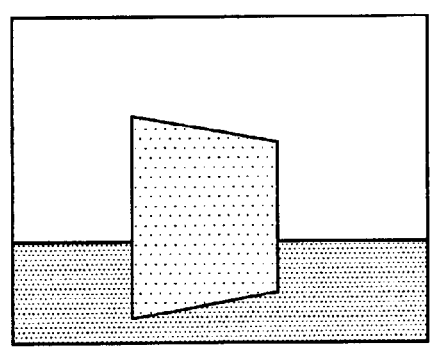
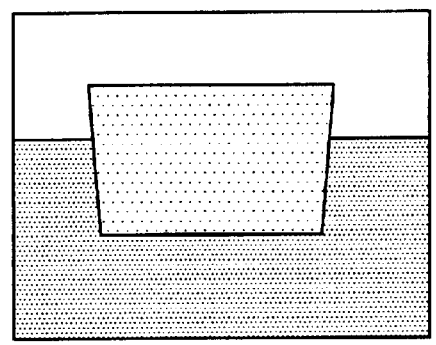
FIG. 5B
FIG. 5C

DEPEND ON VELOCITY OF
CAMERA (HORIZONTAL DIRECTION)

DEPEND ON
VELOCITY
OF CAMERA
(VERTICAL DIRECTION)

FIG. 13

| VELOCITY OF CAMERA (VERTICAL OR HORIZONTAL DIRECTION) | FILTER FUNCTION |
|---|---|
| $v < FP\_SPEED_{min}$ | $h(v)$ |
| $FP\_SPEED_{min} \leq v < FP\_SPEED_{max}$ | $f(v)$ |
| $FP\_SPEED_{max} \leq v$ | $g(v)$ |

IMAGE PROCESSING APPARATUS, IMAGE PROCESSING METHOD, PROGRAM, AND RECORDING MEDIUM

BACKGROUND OF THE INVENTION

1. Field of the Invention

The present invention relates to an image processing apparatus, an image processing method, a program, and a recording medium.

2. Description of the Related Art

Blurry images are often captured owing to camera shake caused by a photographer's hand when capturing a moving image. Image stabilization techniques for stabilizing these blurry images are classified into two types, that is, (1) image stabilization performed when capturing a moving image, and (2) image stabilization performed as post-processing.

The above-mentioned image stabilization performed when capturing an image (1) is stabilization performed when moving images are captured with the use of a video camera, and stabilizing means is embedded in the video camera. On the other hand, image stabilization performed as post-processing (2) is stabilization performed when editing an image after capturing of a moving image, and stabilizing means is installed, for example, in software used for editing of moving images or the like.

"Motion detection" techniques for detecting the motion of a camera when capturing an image for image stabilization are classified into two types, that is, an "electronic detecting method" and a "physical quantity detecting method". The electronic detecting method detects the motion of a video camera when capturing an image by detecting motion vectors through performing signal processing on images. On the other hand, the physical quantity detecting method directly detects the motion of a camera when capturing an image using physical quantity sensors mounted on the camera. The electronic detecting method can be realized by compact and lightweight electronic circuits, which leads to reduction of the price of the video camera, while the electronic detecting method has a disadvantage in that it may induce detection errors more often than the physical quantity detecting method. The physical quantity detecting method has an advantage in that it can more effectively prevent detection errors from occurring than the electronic detecting method, while its electronic circuits becomes large owing to the physical quantity sensors, which leads to an increase in the price of the video camera.

Either the electronic detecting method or the physical quantity detecting method is employed for the image stabilization (1) performed when capturing an image. An image stabilization employing the physical quantity detecting method can provide image stabilization of high quality, but the electronic detecting method is often employed for image stabilization of a low-priced video camera. Only the electronic detecting method is employed as a motion detection method for the image stabilization (2) performed as post-processing. It is difficult to use the physical quantity detecting method because with the physical quantity detecting method there may be trouble in obtaining detected values of the physical quantity sensors.

Japanese Unexamined Patent Application Publication No. 2008-78808 is disclosed in regard to the related art.

SUMMARY OF THE INVENTION

In the case where the image stabilization function to performed when capturing an image is mounted on a video camera, the image stabilization performed in a post-process might be thought unnecessary. As shown in FIG. 5A to FIG. 5D, when the motion detection is carried out with the use of the image stabilization when capturing an image that employs the physical quantity detecting method, it is usual that only a yaw detecting sensor (1) and a pitch detecting sensor (2) are mounted as the physical quantity sensors. Therefore, it is difficult that the physical quantity sensors detect all sorts of motions of the video camera. In addition, there is a problem in that the physical quantity sensors have difficulty in detecting low frequency motions of the video camera owing to the temperature characteristic of its own. In other words, it is difficult that the image stabilization when capturing an image detects the motions of the video camera regarding all space coordinate axes, and specific frequency motions of the video camera owing to hardware constraints to the video camera. FIG. 5A to FIG. 5D are explanatory drawings that show motions of the camera that the sensors can detect. FIG. 5D shows coordinate axes, and FIG. 5A to FIG. 5C show how an object is differently viewed in images owing to the motions of the video camera.

Under such circumstances as described above, the image stabilization in a post-process is performed at moving image editing after photographing in order to compensate the defects of the image stabilization when capturing an image.

In addition, the electronic detecting method has a problem in that focal plane distortions occur owing to an image capturing device. A CCD (charge-coupled device) has been widely used as an image capturing device for a video camera for years. A CCD is used for a global shutter method in which data for one frame are transferred at a time. However, recently a CMOS (complementary metal-oxide semiconductor) device has been becoming popular as an image capturing device. Different from the CCD, the CMOS device is used for a focal plane shutter method (also referred as a rolling shutter method) in which a data for one line are transferred at a time. Therefore, as shown in FIG. 6, when a certain object is photographed, plural images are generated for one frame or field, and one image of the plural images is displayed every one line data display interval. FIG. 6 is an explanatory drawing that shows a readout scheme of a CMOS sensor.

When an object is photographed by a CMOS image capturing device, a vertical line of the object traveling from left to right or from right to left in the screen of the video camera is displayed as oblique lines as shown in FIG. 7A or FIG. 7B individually on the basis of the operation principle of the CMOS image capturing device. If the object is a square or a rectangle, the object is displayed as a parallelogram as shown in FIG. 8A. If the object travels upward or downward in the screen, the object is displayed vertically longer than actually as shown in FIG. 7C, FIG. 7D, or FIG. 8B. Above-described distortions of images will be referred to as "focal plane distortions" of images hereinafter. The focal plane distortions are generated when an object moves or when the pan operation or the tilt operation of a camera is performed. When a camera moves, how much an image of an object is distorted depends on the traveling speed of the camera. FIGS. 7A to 7D, FIG. 8A, and FIG. 8B are explanatory drawings for explaining some examples of focal plane distortions generated in images.

Disclosed in the above-mentioned Japanese Unexamined Patent Application Publication No. 2008-78808 is a technology that reduces the effects of image distortions and improves the accuracy of image stabilization when MOS sensors are used.

The focal plane distortions themselves are generated regardless of image stabilization for moving images. However, there is a problem in that the focal plane distortions are conspicuously recognized by a user when the image stabilization for moving images is performed. In other words, because the entirety of a moving image is displayed with a wobble before the image stabilization is performed, it is difficult for the user to judge whether focal plane distortions are generated or not even if the focal plane distortions are actually generated. As shown in FIG. 9, let's suppose that a camera 10 photographs an object 20 while traveling from (1) to (2). FIG. 9 is an explanatory drawing showing a state where the camera is photographing an object. A relation between a motion of the camera before image stabilization and time is shown by $M_0$ in FIG. 10A. Images of the object during photographing are shown in FIG. 10B. Because the image of the object travels with a wobble in the screen of the camera before the image stabilization, it is difficult for the user to recognize focal plane distortions. FIG. 10A is a graph showing the relation between the motion of the camera and time, and FIG. 10B is an explanatory drawing showing the images of the object during the photographing.

On the other hand, camerawork is stabilized, and the movement of the entirety of the photographed image in the screen is reduced by applying the image stabilization to the photographing. A relation between the motion of the camera and time after the image stabilization is shown by $M_1$ in FIG. 11A. Images of the object during photographing are shown in FIG. 11B. The movement of the entirety of the photographed image in the screen is reduced after the image stabilization, so that the position of the image of the object in the screen is stabilized. As a result, there arises a problem in that, after the image stabilization is performed, it becomes easy for the user to recognize the distortions of the image that are hardly recognized by the user before the image stabilization. FIG. 11A is a graph showing the relation between the motion of the camera and time, and FIG. 11B is an explanatory drawing showing the image of the object during the photographing.

The present invention is achieved with the above-described problems borne in mind, and provides a novel and improved image processing apparatus, image processing method, program, and recording medium that make it difficult for the user to recognize focal plane distortions of images on which image stabilization has been performed.

According to an embodiment of the present invention, there is provided an image processing apparatus that includes a motion detecting unit for detecting the motion quantity of an image on the basis of plural frame images photographed by a CMOS image capturing device; a motion predicting unit for predicting a traveling speed of the image capturing apparatus when capturing an image on the basis of the motion quantity; a correction value calculating unit for calculating a correction value used for correcting the motion quantity of the image so that, the larger the traveling speed is, the longer the traveling motion of the image capturing apparatus intended by a user remains; and a motion compensating unit for performing compensation that allows only the traveling motion of the image capturing apparatus intended by the user to remain in the image with the use of the correction value.

The correction value calculating unit can select a function for calculating the correction value on the basis of a relation between the traveling speed and a threshold value based on readout performance of the CMOS image capturing device.

The function can be a filter function that works: so as to allow the traveling motion of the image capturing apparatus intended by the user to remain when the traveling speed of the image capturing apparatus is large; and so as not to allow the traveling motion of the image capturing apparatus intended by the user to remain when the traveling speed of the image capturing apparatus is small.

The filter function can be obtained with the use of a bilateral filter.

In order to achieve the above-described problems, according to another embodiment of the present invention, an image processing method, which includes the steps of: causing a motion detecting unit to detect the motion quantity of an image on the basis of plural frame images photographed by a CMOS image capturing device; causing a motion predicting unit to predict a traveling speed of the image capturing apparatus when capturing an image on the basis of the motion quantity; causing a correction value calculating unit to calculate a correction value used for correcting the motion quantity of the image so that, the larger the traveling speed is, the longer the traveling motion of the image capturing apparatus intended by a user remains; and causing a motion compensating unit to perform compensation that allows only the traveling motion of the image capturing apparatus intended by the user to remain in the image with the use of the correction value, is provided.

In order to achieve the above-described problems, according to another embodiment of the present invention, a program, which makes a computer function as: means for detecting the motion quantity of an image on the basis of plural frame images photographed by a CMOS image capturing device; means for predicting a traveling speed of the image capturing apparatus when capturing an image on the basis of the motion quantity; means for calculating a correction value used for correcting the motion quantity of the image so that, the larger the traveling speed is, the longer the traveling motion of the image capturing apparatus intended by a user remains; and means for performing compensation that allows only the traveling motion of the image capturing apparatus intended by the user to remain in the image with the use of the correction value, is provided.

In order to achieve the above-described problems, according to another embodiment of the present invention, a computer-readable recording medium for recording a program, which makes a computer function as: means for detecting the motion quantity of an image on the basis of plural frame images photographed by a CMOS image capturing device; means for predicting a traveling speed of the image capturing apparatus when capturing an image on the basis of the motion quantity; means for calculating a correction value used for correcting the motion quantity of the image so that, the larger the traveling speed is, the longer the traveling motion of the image capturing apparatus intended by a user remains; and means for performing compensation that allows only the traveling motion of the image capturing apparatus intended by the user to remain in the image with the use of the correction value, is provided.

According to the above-described embodiments of the present invention, focal plane distortions of photographed images on which image stabilization has been performed can be reduced so that it is difficult for a user to recognize the focal plane distortions.

BRIEF DESCRIPTION OF THE DRAWINGS

FIG. 4A and FIG. 4B are graphs showing relations between a motion of a camera and time;

FIGS. 5A, 5B, 5C, and 5D are explanatory drawings showing motions of the camera that can be detected by sensors;

FIG. 13 is a table showing filter functions corresponding to speeds of the camera;

DESCRIPTION OF THE PREFERRED EMBODIMENT

Figure 1:
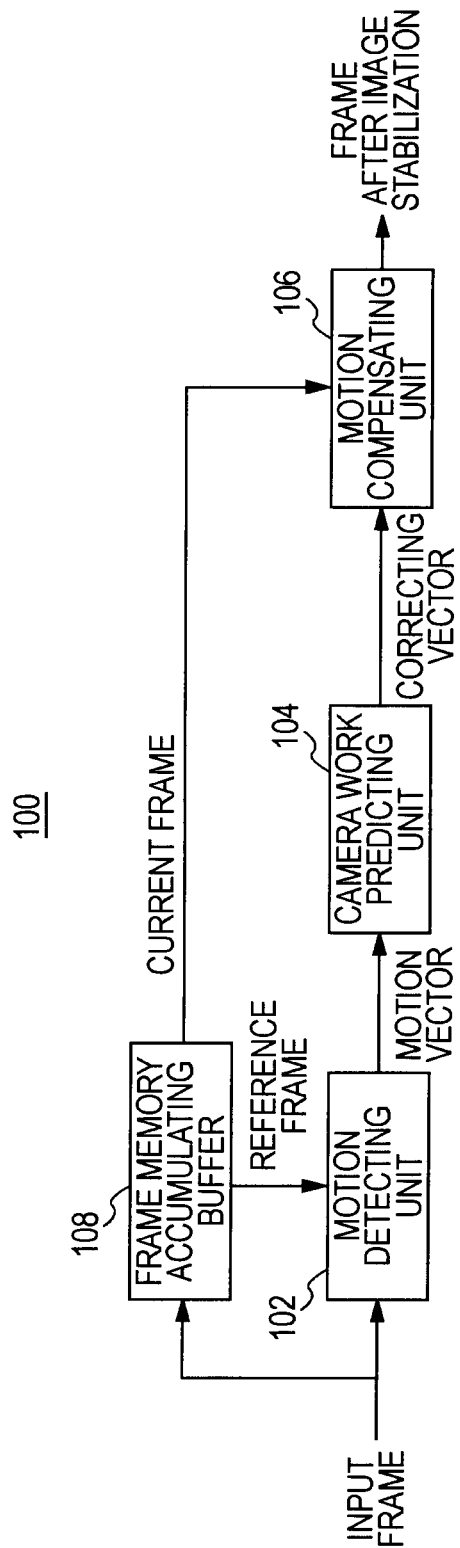
FIG. 1 is a block diagram showing an image processing apparatus according to an embodiment of the present invention.

An embodiment of the present invention will be described hereinafter with reference to the attached drawings. In both this specification and the attached drawings, components that have the same functions are given the same reference numerals, and detail descriptions thereof are given only once.

Description of the embodiment of the present invention will be made regarding the following subjects in this order.
1. Configuration of embodiment of present invention
2. Operation of embodiment of present invention

1. Configuration of Embodiment of Present Invention

Firstly, a configuration of an image processing apparatus 100 according to an embodiment of the present invention will be described with reference to FIG. 1. FIG. 1 is a block diagram showing the image processing apparatus 100 according to this embodiment of the present invention.

The image processing apparatus 100 according to this embodiment of the present invention is, for example, an information processing apparatus such as a personal computer or a server in which an image processing program, like a piece of image editing software, is executed. Moving image data from an image capturing apparatus capable of capturing moving images such as a video camera (also simply referred as "a camera" hereinafter) are input to the image processing apparatus 100. Then, the image processing apparatus 100 performs a variety of image processes on the input moving image data.

The image processing apparatus 100 includes, for example, a motion detecting unit 102, camerawork predicting unit 104, a motion compensating unit 106, a frame memory accumulating buffer 108, and the like.

The motion detecting unit 102 detects motion vectors by performing signal-processing on the moving image data that are input to the image processing apparatus 100. Here, the moving image data is image data made up of plural frame images. As a method for detecting the motion vectors, a typically used method can be used, and therefore detailed description of the method for detecting the motion vectors is omitted from this specification. The motion detecting unit 102 detects the motion vectors on the basis of an input frame of the moving image data and a frame temporarily stored in the frame memory accumulating buffer 108 (a reference frame). The motion vectors are, for example, represented by an affine transformation matrix that has plural parameters. The plural parameters are: component parameters representing motion components such as a component parameter representing a longitudinal translation, a component parameter representing a lateral translation, and a component parameter representing a roll-directional rotation; and component parameters representing focal plane distortion components such as a component parameter representing a longitudinal scaling, and a component parameter representing a degree of a parallelogram type distortion.

The motion of the camera when capturing a moving image can be calculated with the use of the motion vectors detected by the motion detecting unit 102. The motion of the camera when capturing a moving image includes camera shake caused by a photographer's hand, a pan operation of the camera, and a tilt operation of the camera. The motion of the camera when capturing a moving image is depicted, for example, by fine lines in FIG. 4A and FIG. 4B. FIG. 4A and FIG. 4B are graphs showing relations between the motion of the camera and time. FIG. 4A shows the motion of the camera during a comparatively long time period. FIG. 4B is an enlarged view of part of FIG. 4A.

The camerawork predicting unit 104 predicts camerawork by filter-processing the motion components of the camera on the basis of the detected motion vectors. The camerawork is the motion of a camera intended by a photographer when capturing a moving image such as a pan operation, a tilt operation, a rotating operation, and the like that are obtained by removing camera shake caused by the user's hand from the raw motion of the camera. In this case, the camerawork is depicted by heavy lines in FIG. 4A and FIG. 4B. The camerawork predicting unit 104 generates correction vectors, and sends the correction vectors to the motion compensating unit 106.

The motion compensating unit 106 generates a frame image, on which image stabilization is performed, on the basis of the correction vectors generated by the camerawork predicting unit 104. In other words, the motion compensating unit 106 corrects the frame images on the basis of camera works predicted by the camerawork predicting unit 104 so that the image frames based on the camerawork can be generated one by one. As a result, the corrected image frames are sequentially output. The motion compensating unit 106 obtains a frame that is a target of the correction (a current frame) from the frame memory accumulating buffer 108, and performs image stabilization processing on the frame on the basis of the correction vectors. As a method for compensating the motion, a typically used method can be used, and therefore detailed description about the method for compensating the motion is omitted from this specification.

Figure 2:
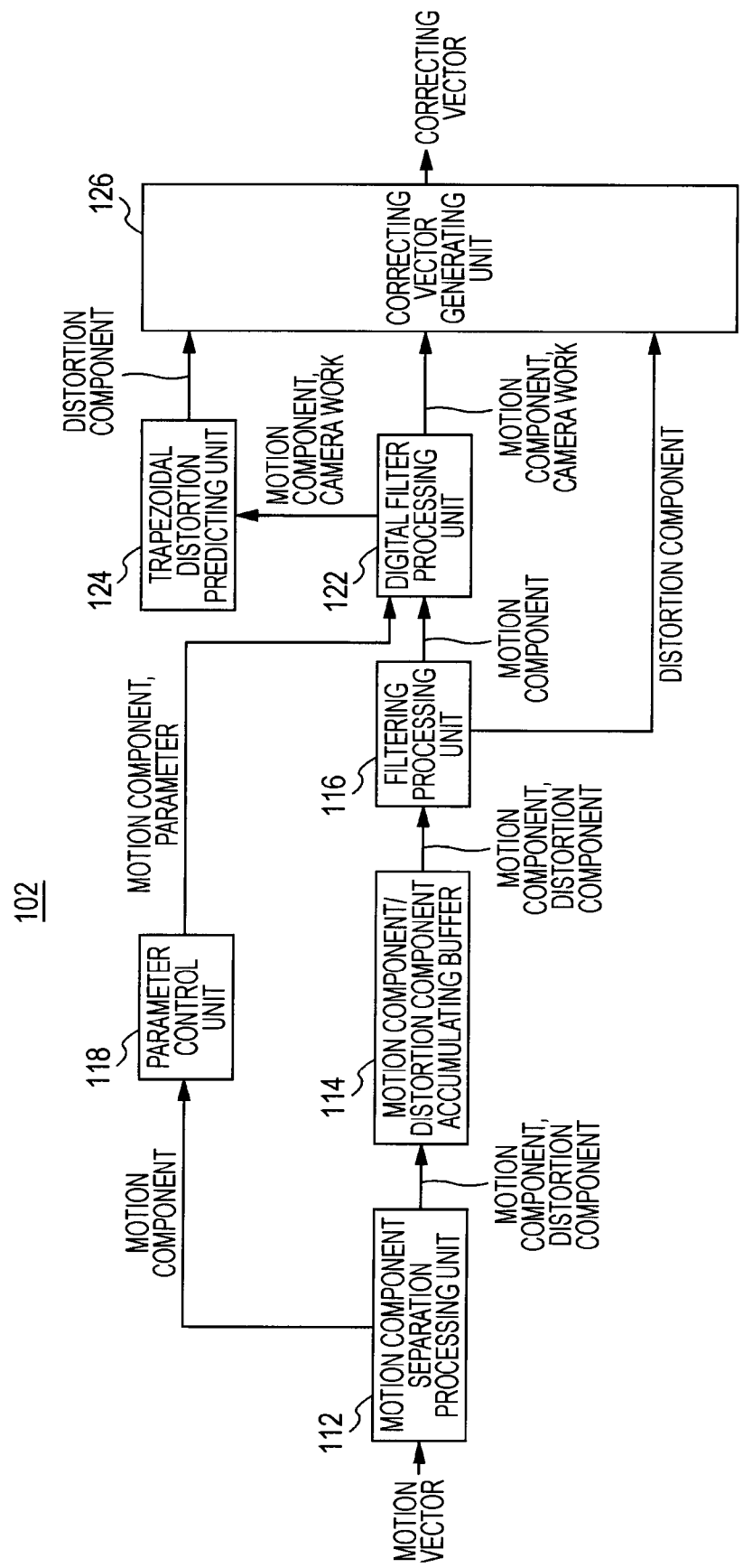
FIG. 2 is a block diagram showing camerawork predicting unit according to the embodiment of the present invention.

Next, a configuration of the camerawork predicting unit 104 according to the embodiment of the present invention will be described with reference to FIG. 2. FIG. 2 is a block diagram showing the camerawork predicting unit 104 according to the embodiment of the present invention.

The camerawork predicting unit 104 includes, for example, a motion component separation processing unit 112, a motion component/distortion component accumulating buffer 114, a filtering processing unit 116, a parameter control unit 118, a digital filter processing unit 122, a trapezoidal distortion predicting unit 124, a correction vector generating unit 126, and the like.

The motion component separation processing unit 112 separates the motion vectors into motion components that represent the motion of the camera and FP distortion components that represent the focal plane distortion. The motion component separation processing unit 112 sends the motion components to the parameter control unit 118, and sends the motion components and the FP distortion components to the motion component/distortion component accumulating buffer 114.

The motion component/distortion component accumulating buffer 114 employs, for example, a FIFO (first-in first-out) scheme, and accumulates the motion components and the FP distortion components and temporarily stores them. Owing to this storing function, lowpass filter processing can be performed on plural frames that are captured at intervals.

The filtering processing unit 116 performs filtering on the motion components and the FP distortion components. The filtering processing unit 116 selects only FP distortion components and motion components generated from highly reliable motion vectors on the basis of degrees of reliability of the motion vectors. The filtering processing unit 116 sends only motion vectors that are highly reliable and unlikely to be erroneous to the digital filter processing unit 122 and the correction vector generating unit 126. In addition, the filtering processing unit 116 sends the motion components on which filtering processing has been performed to the digital filter processing unit 122, and sends the FP components on which the filtering processing has been performed to the correction vector generating unit 126.

After receiving the motion components from the motion component separation processing unit 112, the parameter control unit 118 generates parameters on the basis of the motion components. The parameter control unit 118 sends the generated parameters to the digital filter processing unit 122. The generated parameters determine what filter function is to be used in the digital filter processing unit 122.

Figure 18:
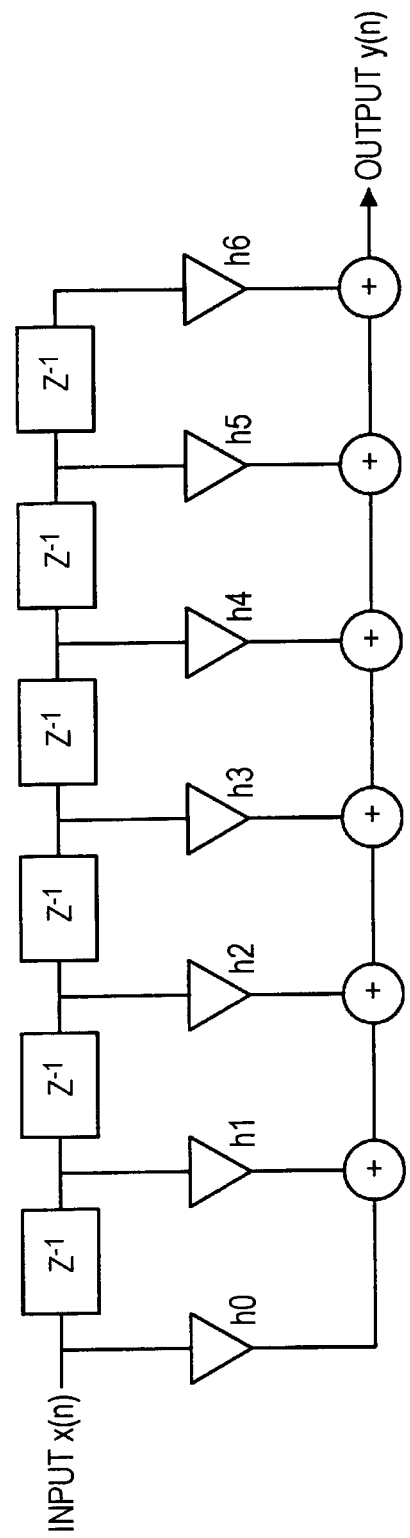
FIG. 18 is an explanatory block diagram showing an FIR filter.

The digital filter processing unit 122 generates camerawork quantity on the basis of the motion components and the parameters. The digital filter processing unit 122 generates the camerawork quantity that represents the motion intended by a user by putting the motion components through an LPF with a predetermined taps. To put it concretely, the digital filter processing unit 122 obtains motion components whose number is equal to the number of the taps of the LPF, and after putting the motion components through an FIR filter shown in FIG. 18, for example, the digital filter processing unit 122 obtains camera work motion components. FIG. 18 is an explanatory diagram showing the FIR filter. The camerawork motion components represents the camerawork quantity. The digital filter processing unit 122 sends the camerawork motion components (the camerawork quantity), which are motion components on which the filtering has been performed, to the correction vector generating unit 126.

The trapezoidal distortion predicting unit 124 predicts angle changes of the yaw direction and the pitch direction on the basis of the motion components, and calculates a trapezoidal distortion quantity owing to the angle changes. The trapezoidal distortion predicting unit 124 sends the trapezoidal distortion quantity to the correction vector generating unit 126.

The correction vector generating unit 126 generates correction vectors on the basis of the FP components on which the filtering processing has been performed, the motion components on which the filtering processing has been performed, the camerawork motion components (the camerawork quantity), and the trapezoidal distortion quantity. The correction vector generating unit 126 sends the generated correction vectors to the motion compensating unit 106.

The above-described series of image processing operations can be performed either by hardware or by software.

2. Operation of Embodiment of Present Invention

Figure 3:
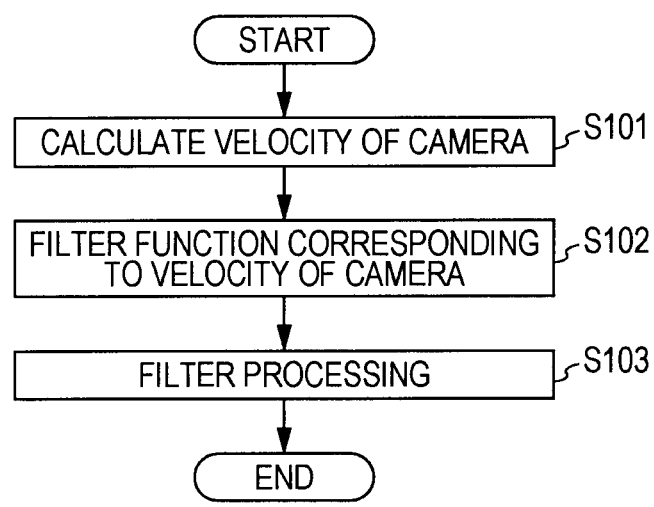
FIG. 3 is a flowchart showing an operation of the camerawork prediction of the image processing apparatus according to the embodiment of the present invention.
Figure 6:
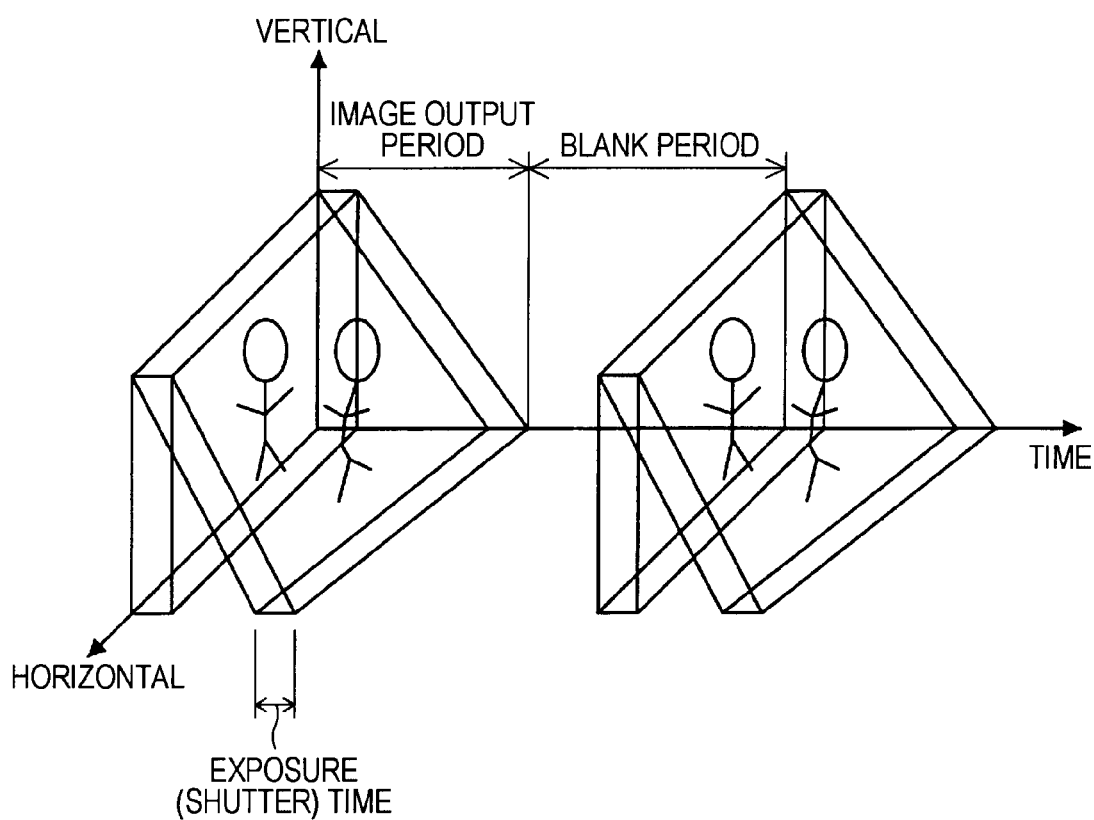
FIG. 6 is an explanatory drawing showing a readout scheme of a CMOS sensor.
Figure 7A:
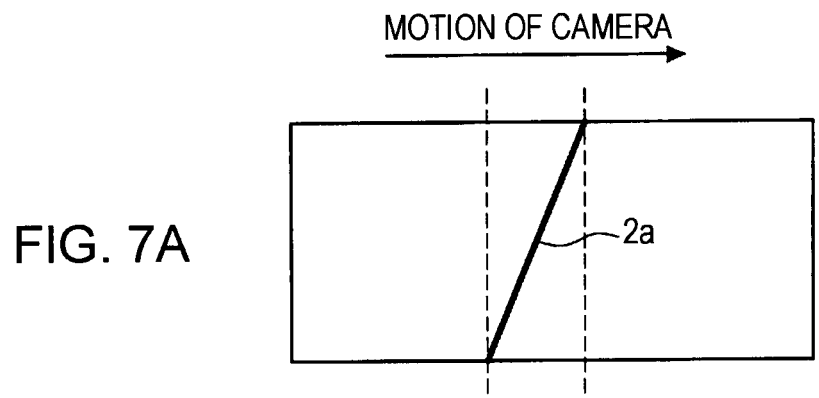
FIGS. 7A, 7B, 7C, and 7D are explanatory drawings showing focal plane distortions generated in images.
Figure 7B:
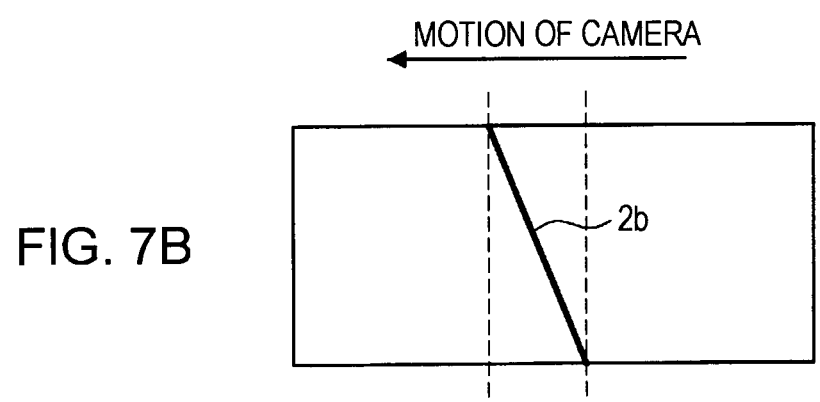
Figure 7C:
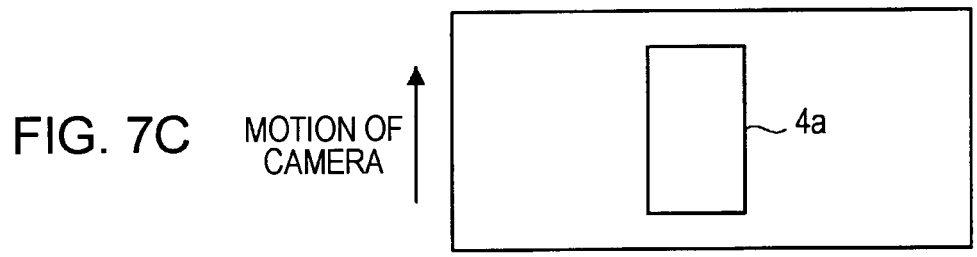
Figure 7D:
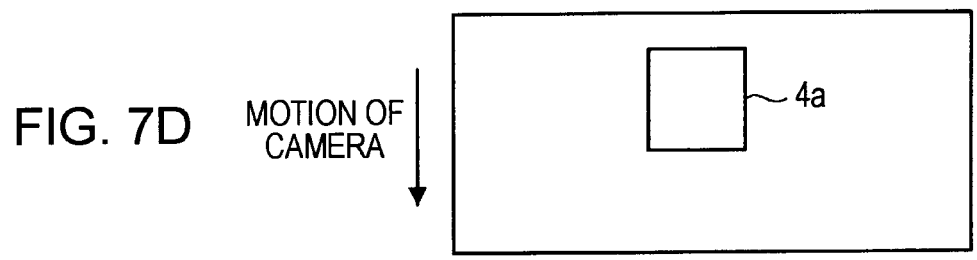
Figure 8A:
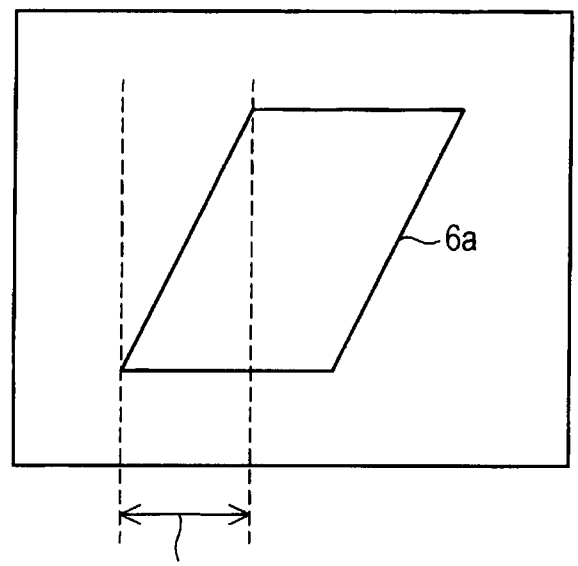
FIG. 8A and FIG. 8B are explanatory drawings showing focal plane distortions generated in images.
Figure 8B:
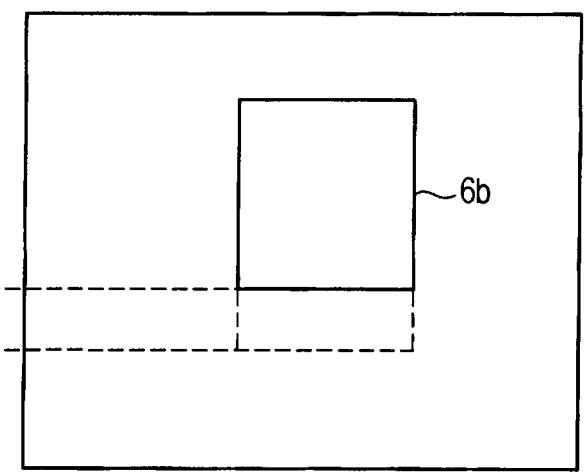
Figure 9:
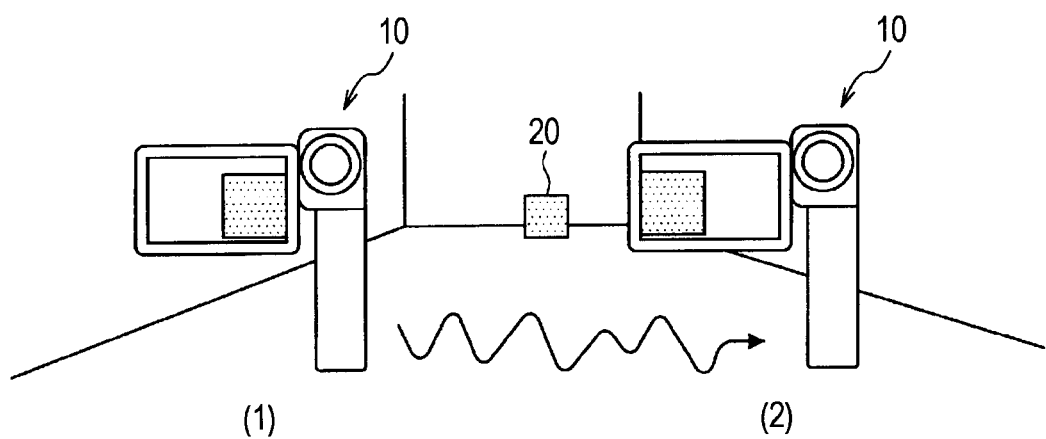
FIG. 9 is an explanatory drawing showing a state where the camera is photographing an object.

Next, the camerawork predicting operation of the image processing apparatus 100 according to an embodiment of the present invention will be described hereinafter. FIG. 3 is a flowchart showing an operation of the camerawork prediction of the image processing apparatus 100 according to the embodiment of the present invention. There is a problem in that the focal plane distortions are conspicuously recognized by a user when the image stabilization for moving images is performed and camerawork is stabilized. In this embodiment of the present invention, ideally it is desirable that camerawork that a user can hardly recognize is allowed to remain in order for images to move, so that it becomes difficult for the user to recognize the focal plane distortions.

Figure 12A:
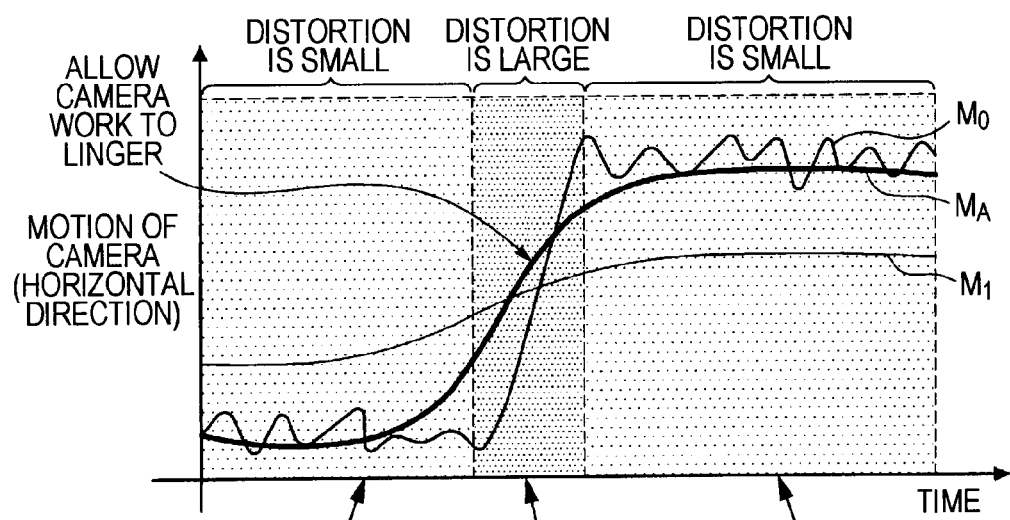
FIG. 12A is a graph showing another relation between the motion of the camera and time.
Figure 12B:
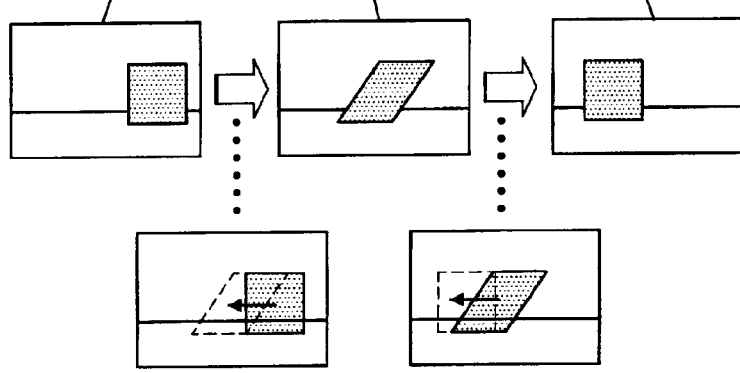
FIG. 12B is an explanatory drawing showing images of the object during the photographing.

After motion vectors are detected by the motion detecting unit 102, motion components are separated from the motion vectors in the camerawork predicting unit 104. Afterward, in the camerawork predicting unit 104, the motion of a camera, and the speed of the camera are calculated on the basis of the separated motion vectors (Step S101). For example, the motion of the camera is shown by $M_0$ in FIG. 12A. In this embodiment of the present invention, because focal plane distortions seldom occur and the degrees of the distortions are also small in a time period where the motion of the camera is mainly composed of camera shake caused by the user's hand and there is a small amount of camerawork, the process that does not allow the camerawork to remain in the time period is performed (thin shaded regions in FIG. 12A). On the other hand, because the focal plane distortions easily occur and the degrees of the distortions are large in a time period where the motion of the camera is composed of not only the camera shake caused by the user's hand but also a considerable amount of camerawork, the process that allows the camerawork to remain in the time period is performed (a thick shaded region in FIG. 12A). FIG. 12A is a graph showing a relation between the motion of the camera and time, and FIG. 12B is an explanatory drawing showing images of the object during the image capturing.

Therefore, in order to adjust the degree of camerawork to be allowed to remain, a filter function used in the digital filter processing unit 122 is selected on the basis of the speed of the camera. In other words, a filter function corresponding to the speed of the camera calculated at Step S101 is selected (Step S102). To put it concretely, if the speed of the camera is large, a filter function that allows images to travel with the camerawork remaining is selected, and if the speed of the camera is small, a filter function that allows images to stand still without the camerawork is selected.

Next, in the digital filter processing unit 122, filter processing is performed with the use of the filter function selected at Step S102. As a result, if the speed of the camera is large, frame images that travel with the camerawork remaining are obtained, and if the speed of the camera is small, frame images that stand still without the camerawork are obtained. The motion of the camera on which the filter processing is performed is shown by $M_A$ in FIG. 12A.

Figure 10A:
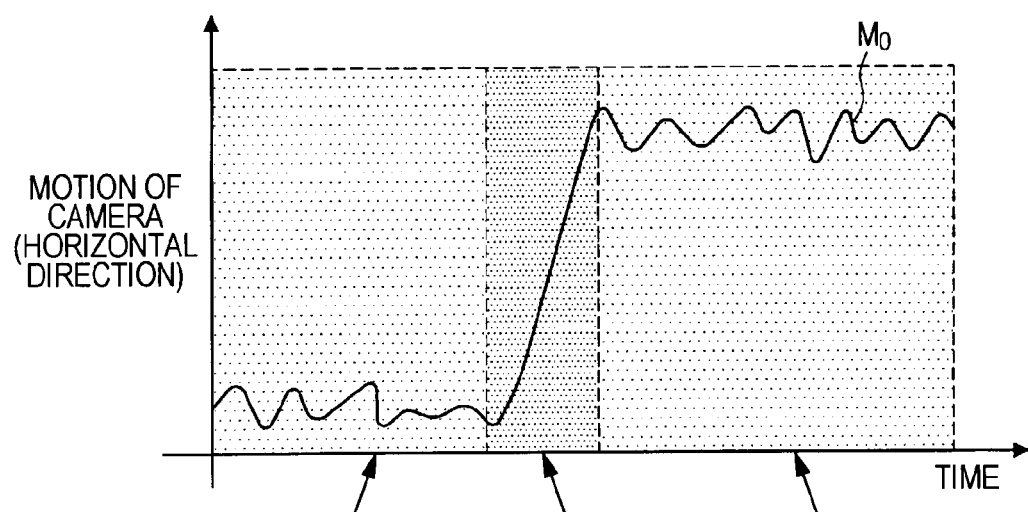
FIG. 10A is a graph showing a relation between a motion of the camera and time.
Figure 10B:
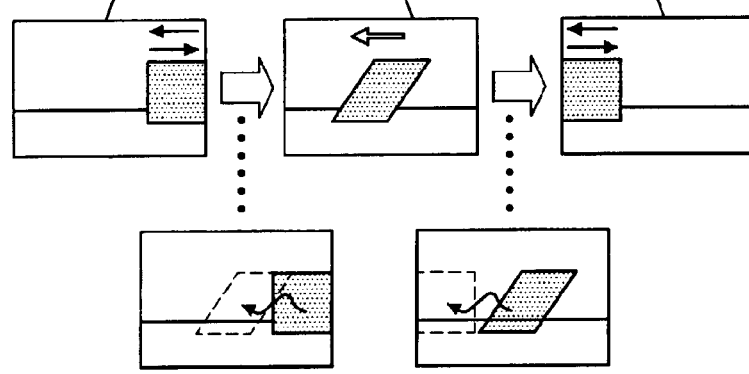
FIG. 10B is an explanatory drawing showing images of the object during the photographing.
Figure 11A:
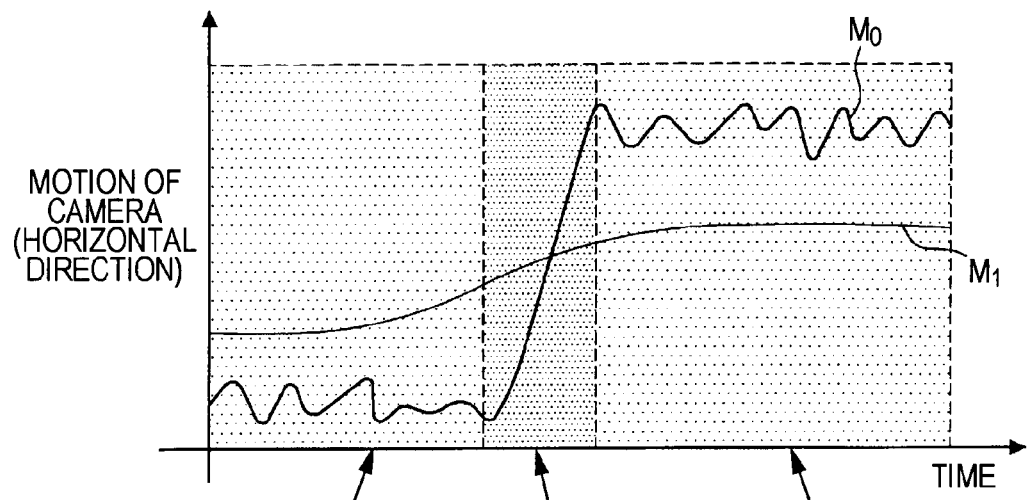
FIG. 11A is a graph showing another relation between the motion of the camera and time.
Figure 11B:
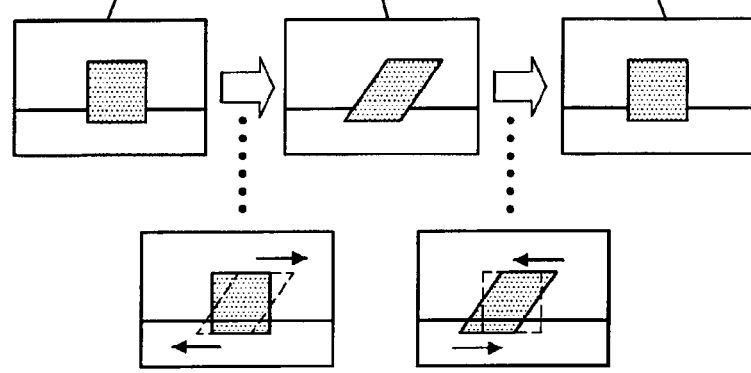
FIG. 11B is an explanatory drawing showing images of the object during the photographing.

In the related art, when camerawork is extracted, only one filter function is used regardless of the speed of the camera. Therefore, the obtained motion of the camera is, for example, the one shown by $M_1$ in FIG. 11A or by $M_1$ in FIG. 12A. Therefore, images stand still as shown in FIG. 11B, with the result that, when focal plane distortions occur, they are easily recognized by a user. In the screen, although the positions of the images stand still, the image of the object located at the center of the screen seems to be distorted, so that the distortion is recognized by the user. On the other hand, according to this embodiment of the present invention, although the traveling distance of an image after correction is shorter than that before the correction, the image travels a little as shown in FIG. 12B (Refer to FIG. 10B about the traveling distance before the correction), with the result that, even if the image of the object located at the center of the screen is distorted, the distortion is not easily recognized by the user.

Next, how to select a filter function will be described below. Different filter functions are selected, for example, in three cases as shown in FIG. 13. FIG. 13 is a table showing filter functions corresponding to speeds of the camera. If the speed of the camera v is smaller than $FP\_SPEED_{min}$, a filter function h(v) is selected. If the speed of the camera v is larger than or equal to $FP\_SPEED_{min}$ and smaller than $FP\_SPEED_{max}$, a filter function f(v) is selected. If the speed of the camera v is larger than or equal to $FP\_SPEED_{max}$, a filter function g(v) is selected. The values of $FP\_SPEED_{min}$ and $FP\_SPEED_{max}$ are determined on the basis of the readout performance of a CMOS image capturing device. In addition, these values are also determined on the basis of a value of the speed of the camera that causes the user to begin to recognize the distortion.

$FP\_SPEED_{min}$ is a value of the speed of the camera that causes the user to begin to recognize the distortion, and $FP\_SPEED_{max}$ is a value of the speed of the camera that causes the user to begin to feel unbearably annoyed with the distortion.

The filter function h(v) is a lowpass filter function that is used for generating camerawork in the related art. The filter function g(v) is a lowpass filter function with the minimum lowpass characteristic necessary used in the case where the speed of the camera is large and the distortion quantity is too large, and the filter function g(v) is used to allow the speed of the camera to sufficiently remain even after the camerawork is generated. If an input image is used as it is, g(v)=v. The filter function f(v) is a lowpass filter function whose lowpass characteristic varies in accordance with the speed of the camera. For example, if v=$FP\_SPEED_{min}$, f(v) is a lowpass filter function whose lowpass characteristic is equal to that of h(v), and its lowpass characteristic becomes weak as the speed of the camera becomes large. If v=$FP\_SPEED_{max}$, f(v) is a lowpass filter function whose lowpass characteristic is equal to that of g(v).

Figure 19:
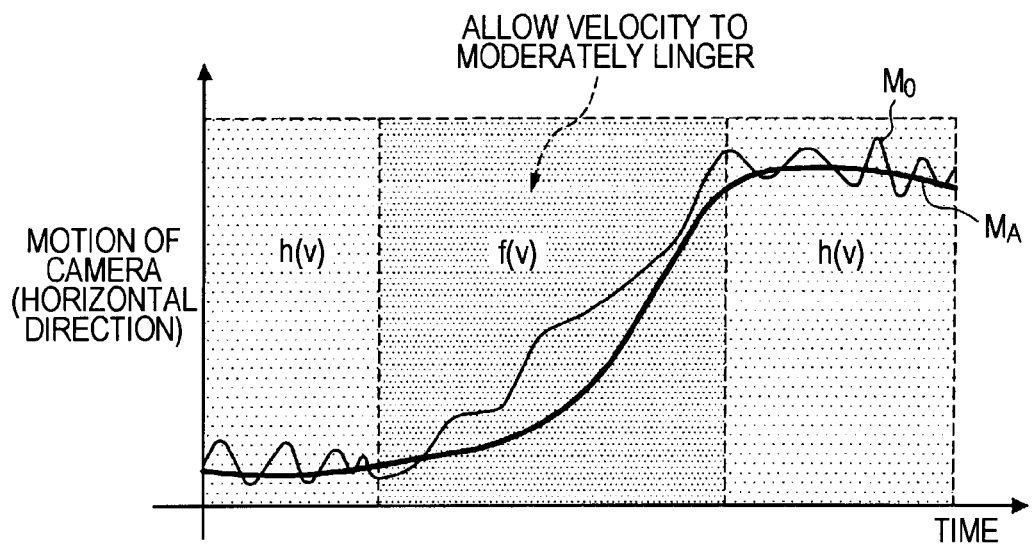
FIG. 19 is a graph showing a relation between a motion of the camera and time.
Figure 20:
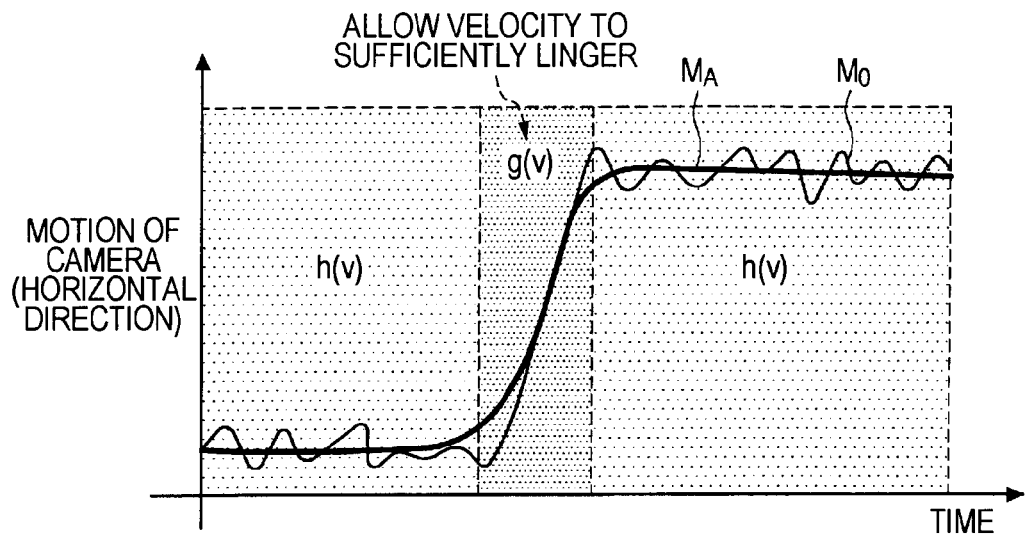
FIG. 20 is a graph showing another relation between a motion of the camera and time.

The relation between the filter functions and the motion of the camera will be described with reference to FIG. 19 and FIG. 20 below. FIG. 19 and FIG. 20 are graphs showing relations between the motion of the camera and time. As shown in the thick shaded region of FIG. 20, in the case where the camerawork considerably varies and the speed of the camera is large, the filter function g(x) is used to allow the speed of the camera to sufficiently remain. On the other hand, as shown in the thick shaded region of FIG. 19, in the case where the camerawork considerably varies but the speed of the camera is not so large, the filter function f(x) is used to allow the speed of the camera to moderately remain. In addition, as shown in the thin regions of FIG. 19 and FIG. 20, in the case where the camerawork hardly varies and the speed of the camera is small, the filter function h(x) is used.

To be exact, $FP\_SPEED_{min}$ used for the speed of the camera in the horizontal direction and that used for the speed of the camera in the vertical direction are different from each other. The same is true for $FP\_SPEED_{max}$ used for the speed of the camera in the horizontal direction and that used for the speed of the camera in the vertical direction. This is because how the user recognizes the degree of distortion in the horizontal direction and how the user recognizes the degree of distortion in the vertical direction are different from each other. In addition, the focal plane distortions in the horizontal direction and the vertical direction have been described so far because they are easily recognized by the user, but different embodiments of the present invention may be applied to focal plane distortions other than the above-described focal plane distortions. For example, another embodiment of the present invention may be applied to a focal plane distortion generated by a roll-directional rotation.

Next, how camerawork is generated by digital filter processing will be described below. In order to realize "the filter functions corresponding to the speeds of a camera" described above, a bilateral filter can be employed, for example. With the use of the bilateral filter, the filter characteristic can be changed in accordance with the speed of the camera. In addition, in the case of switching plural filter functions in accordance with the speeds, a problem in that a discontinuous characteristic occurs at the switching point (point a or point b in FIG. 14, for example) does not arise if the bilateral filter is used.

The characteristic of the bilateral filter used in the digital filter processing unit 122 is represented by the following equation.

$$y(n) = \frac{1}{K} \sum_{i=-N}^{N} x(n+i)h(i)c(v_1) \quad \text{[Equation 1]}$$

$$K = \sum_{i=-N}^{N} h(i)c(v_1)$$

$$c(v_1) = e^{-\frac{1}{2}\{\frac{v_1}{\sigma}\}^2}$$

Figure 16:
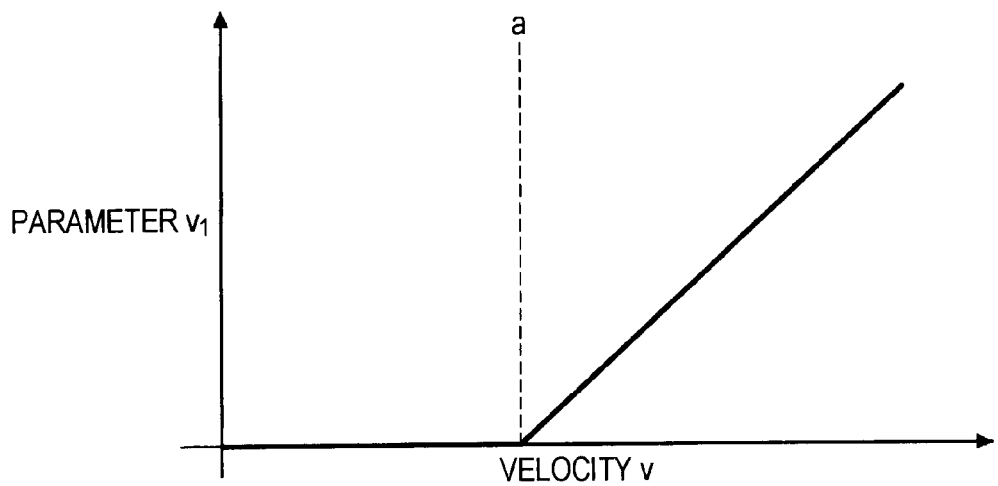
FIG. 16 is a graph showing the relation between a parameter $v_1$ and the speed of the camera v.
Figure 17:
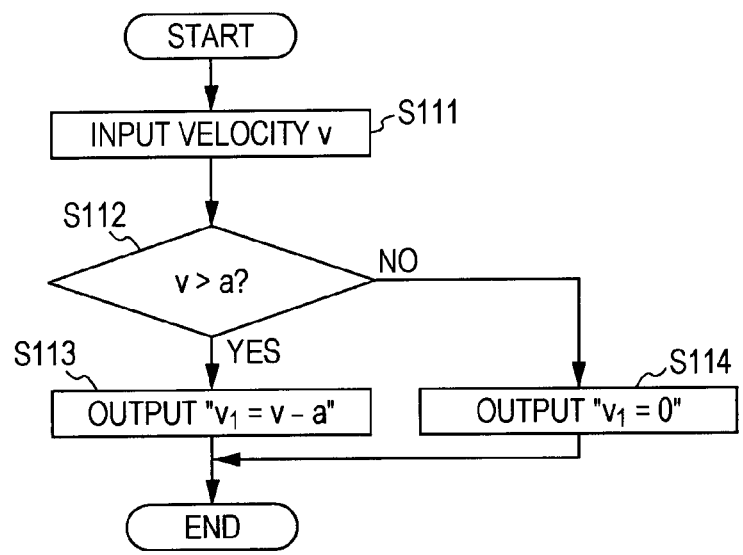
FIG. 17 is a flowchart showing a calculation operation for calculating the parameter $v_1$.

In the above equation, $c(v_1)$ is a weight function. The parameter $v_1$ of the weight function is determined in the parameter control unit 118 on the basis of the speed of the camera v as shown in FIG. 16 and FIG. 17 in order to realize "the filter functions corresponding to the speeds of a camera". FIG. 16 is a graph showing the relation between the parameter $v_1$ and the speed of the camera v. FIG. 17 is a flowchart showing a calculation operation for calculating the parameter $v_1$.

The characteristic shown in FIG. 16 is represented by the following equation.

$$v_1 = s(v) = \begin{cases} 0 & (v \leq a) \\ v - a & (v > a) \end{cases} \quad \text{[Equation 2]}$$

In other words, if the speed of the camera v is larger than a, the parameter $v_1=v-a$, and if the speed of the camera v is equal to or smaller than a, the parameter $v_1=0$.

Figure 14:
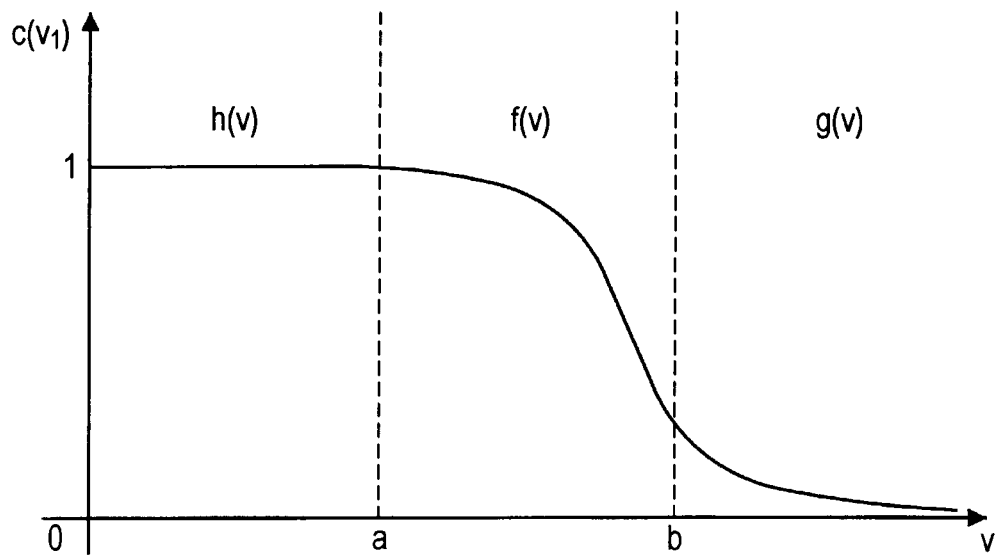
FIG. 14 is a graph showing a relation between a weight function $c(v_1)$ and the speed of the camera v.
Figure 15:
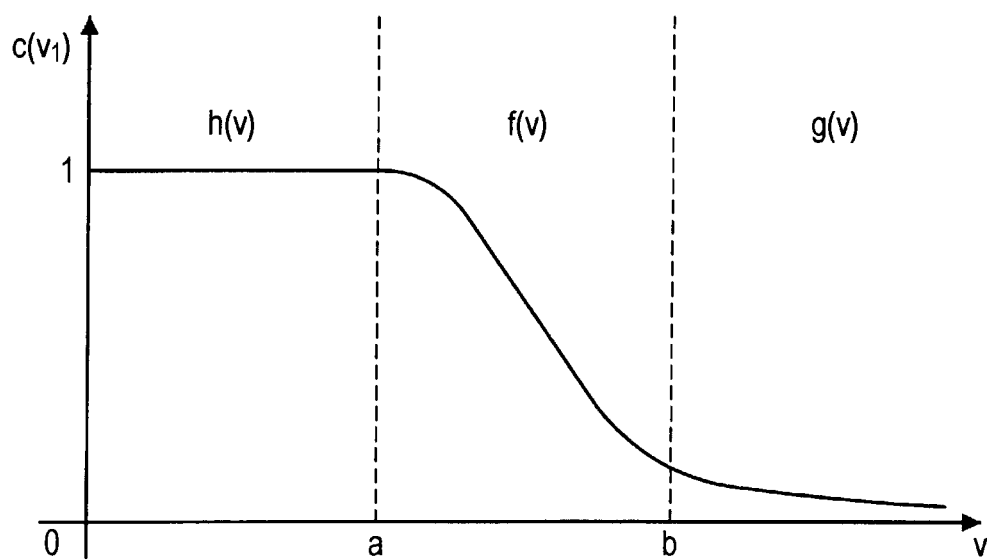
FIG. 15 is a graph showing another relation between a weight function $c(v_1)$ and the speed of the camera v.

FIG. 14 is a graph showing a relation between a weight function $c(v_1)$ and the speed of the camera v, and FIG. 15 is a graph showing another relation between a weight function $c(v_1)$ and the speed of the camera v. As shown in FIG. 14 and in FIG. 15, by setting $a \geq FP\_SPEED_{min}$, a lowpass filter h(x) that is used in the related art can be used in the case where $v<FP\_SPEED_{min}$. In addition, in the case where $FP\_SPEED_{min} \leq v$, the value of the weight function decreases as the speed of the camera increases, and the lowpass characteristic becomes weak as the speed of the camera increases. In other words, the effect of the lowpass filter is gradually lost, and $c(v_1)$ asymptotically approaches zero. As a result, if the weight function becomes sufficiently small, the speed of the camera sufficiently remains, with the result that the filter function can be regarded as being g(v). The value of g(v) when v=b shows the degree of the speed to be allowed to remain when $v=FP\_SPEED_{max}$. This degree can be adjusted by a parameter σ.

The difference between FIG. 14 and FIG. 15 is the difference between the characteristics of f(x) in FIG. 14 and f(x) in FIG. 15. In the case where f(x) in FIG. 15 is adopted, the effect of image stabilization is less sufficient, but it is more difficult for focal plane distortions to be recognized than in the case where f(x) in FIG. 14 is adopted.

In the calculation of the camerawork with the use of the lowpass filter h(x) that is used in the related art, the input motion components are put through a lowpass filter with a predetermined taps shown in FIG. 18, for example. To put it concretely, after obtaining component parameters corresponding to the number of the taps of the lowpass filter from the "motion component/distortion component accumulating buffer", the digital filter processing unit 122 performs filter processing. FIG. 18 shows an example of an FIR filter used for the filter processing. After the motion components are put through such a filter, camera work motion components are generated.

The output of the digital filter processing unit 122 is a combination of the camerawork motion components after filtering and any one of the input parameters (the central motion component (motion component before filtering) input into h3 of the FIR filter shown in FIG. 18, for example).

In digital filter processing of the related art, only the stabilization of the camerawork is taken into consideration. Therefore, images whose focal plane distortions are easily recognized are generated. On the other hand, according to the embodiment of the present invention, the filter functions corresponding to the speeds of the camera is selected, so that images with focal plane distortions that are not easily recognized by a user are generated.

The present application contains subject matter related to that disclosed in Japanese Priority Patent Application JP 2009-266704 filed in the Japan Patent Office on Nov. 24, 2009, the entire content of which is hereby incorporated by reference.

Although the preferred embodiment of the present invention has been described in reference with the attached drawings, the present invention is not limited only to the above-described embodiment. It will be obvious to those skilled in the art that various modifications and alterations may occur within the scope of technological ideas of the appended claims or the equivalents thereof. Therefore, it should be understood that all these modifications and alternations fall within the technological scope of the present invention.

What is claimed is:

1. An image processing apparatus comprising:
a motion detecting unit for detecting an amount of motion of an image on the basis of a plurality of frame images captured by a CMOS image capturing device;
a motion predicting unit for predicting a traveling speed of the image capturing apparatus when an image is being captured on the basis of the amount of motion;
a correction value calculating unit for calculating a correction value used for correcting the amount of motion of the image so that, the larger the traveling speed is, the long the traveling motion of the image capturing apparatus intended by a user remains, wherein the correction value calculating unit selects a function for calculating the correction value on the basis of a relation between the traveling speed and a threshold value based on the readout performance of the CMOS image capturing device; and
a motion compensating unit for performing compensation that allows only the traveling motion of the image capturing apparatus intended by the user to remain in the image with the use of the correction value.

2. The image processing apparatus according to claim 1, wherein the function is a filter function that operates:
so as to allow the traveling motion of the image capturing apparatus intended by the user to remain when the traveling speed of the image capturing apparatus is large; and
so as not to allow the traveling motion of the image capturing apparatus intended by the user to remain when the traveling speed of the image capturing apparatus is small.

3. The image processing apparatus according to claim 1, wherein the filter function is obtained with the use of a bilateral filter.

4. An image processing method comprising the steps of:
causing a motion detecting unit to detect an amount of motion of an image on the basis of a plurality of frame images captured by a CMOS image capturing device;
causing a motion predicting unit to predict a traveling speed of the image capturing apparatus when an image is being captured on the basis of the motion quantity;
causing a correction value calculating unit to calculate a correction value used for correcting the amount of motion of the image so that, the larger the traveling speed is, the longer the traveling motion of the image capturing apparatus intended by a user remains, wherein the correction value calculating unit selects a function for calculating the correction value on the basis of a relation between the traveling speed and a threshold value based on the readout performance of the CMOS image capturing device; and
causing a motion compensating unit to perform compensation that allows only the traveling motion of the image capturing apparatus intended by the user to remain in the image with the use of the correction value.

5. A method for image processing comprising:
detecting an amount of motion of an image on the basis of a plurality of frame images captured by a CMOS image capturing device;
predicting a traveling speed of the image capturing apparatus when an image is being captured on the basis of the amount of motion;
calculating a correction value used for correcting the amount of motion of the image so that, the larger the traveling speed is, the longer the traveling motion of the image capturing apparatus intended by a user remains, wherein calculating the correction value comprises calculating the correction value on the basis of a relation between the traveling speed and a threshold value based on the readout performance of the CMOS image capturing device; and performing compensation that allows only the traveling motion of the image capturing apparatus intended by the user to remain in the image with the use of the correction of value.

6. A non-transitory computer-readable recording medium for recording a program that makes a computer function as:

means for detecting an amount of motion of an image on the basis of a plurality of frame images captured by a CMOS image capturing device;

means for predicting a traveling speed of the image capturing apparatus when an image is being captured on the basis of the motion quantity;

means for calculating a correction value used for correcting the amount of motion of the image so that, the larger the traveling speed is, the longer the traveling motion of the image capturing apparatus intended by a user remains, wherein the means for calculating a correction value comprises means for calculating the correction value on the basis of a relation between the traveling speed and a threshold value based on the readout performance of the CMOS image capturing device; and means for performing compensation that allows only the traveling motion of the image capturing apparatus intended by the user to remain in the image with the use of the correction value.

* * * * *